United States Patent [19]

Okada

[11] Patent Number: 5,659,808

[45] Date of Patent: Aug. 19, 1997

[54] OPTICAL APPARATUS

[75] Inventor: Tadanori Okada, Yokohama, Japan

[73] Assignee: Canon Kabushiki Kaisha, Tokyo, Japan

[21] Appl. No.: 683,952

[22] Filed: Jul. 19, 1996

[30] Foreign Application Priority Data

Jul. 20, 1995 [JP] Japan .................... 7-184185

[51] Int. Cl.$^6$ .................................... G03B 5/00
[52] U.S. Cl. ........................................... 396/55
[58] Field of Search ............................ 396/53, 52, 55; 348/208; 359/554–557

[56] References Cited

U.S. PATENT DOCUMENTS

| | | | |
|---|---|---|---|
| 5,555,061 | 9/1996 | Soshi et al. .................. | 396/53 |
| 5,559,570 | 9/1996 | Soshi et al. .................. | 396/53 |

*Primary Examiner*—W. B. Perkey
*Attorney, Agent, or Firm*—Fitzpatrick, Cella, Harper & Scinto

[57] ABSTRACT

The present invention is directed to an optical apparatus which includes a fluctuation detection device (fluctuation sensors) for detecting a fluctuation of the apparatus; a frame body (comprised of a fixed barrel, an exterior ring, a mount, a back lid, and so on) for holding the fluctuation detection device; and an optical member (fixed lens), wherein the frame body and the optical member are operated in order to substantially shield between a movable member (a shutter member of camera) and the fluctuation detection device so as to prevent a fluctuation of air caused by an operation of the movable member from traveling to the fluctuation detection device through the frame body. By this structure, the fluctuation of air caused by the operation of the movable member is prevented from being transmitted to the fluctuation detection device through the frame body, thereby preventing the fluctuation of air from affecting the detection operation of the fluctuation detection device.

10 Claims, 3 Drawing Sheets

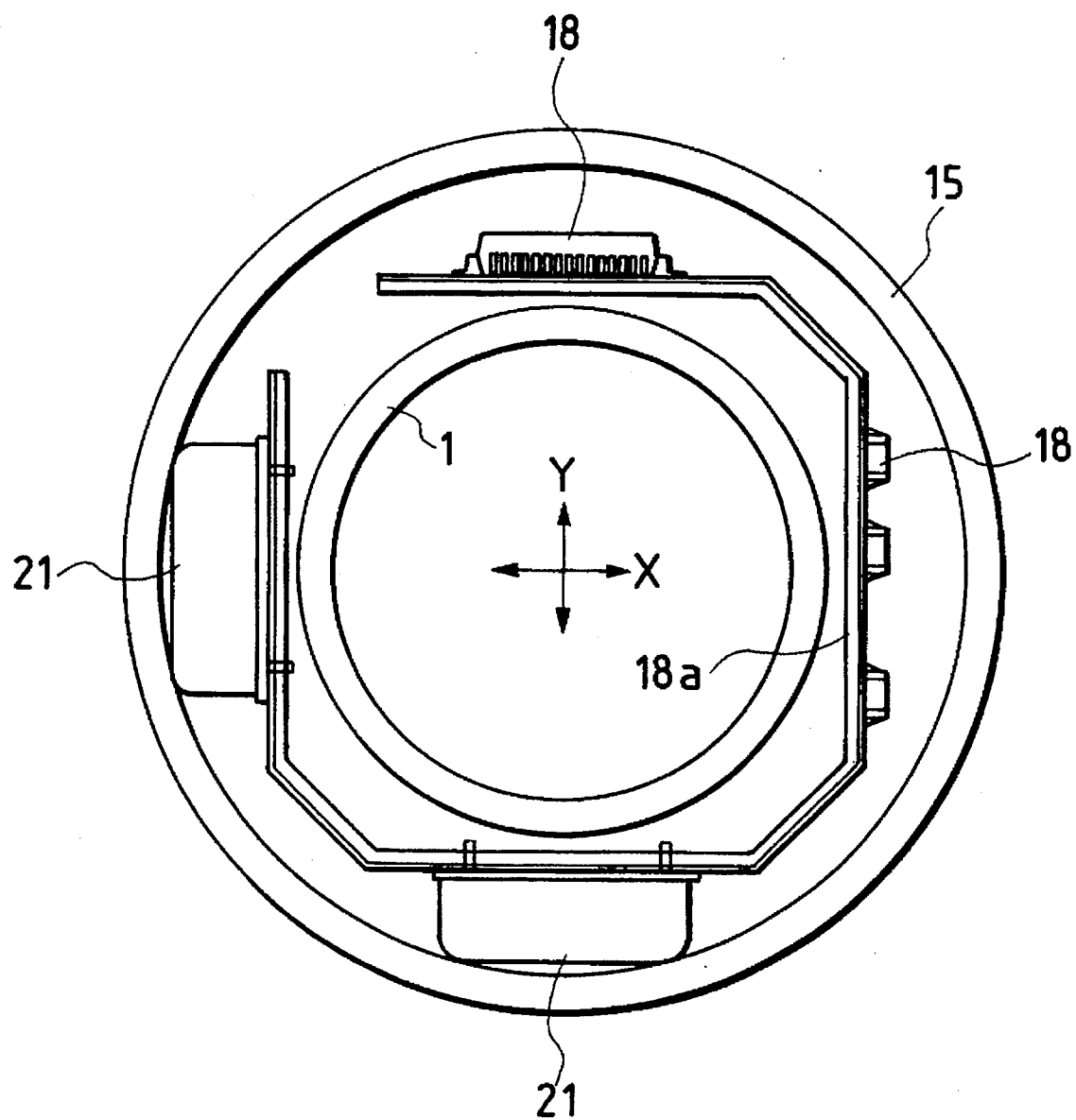

OPTICAL APPARATUS

BACKGROUND OF THE INVENTION

1. Field of the Invention

The present invention relates to an optical apparatus, and more particularly, to an optical apparatus having a function to prevent an image blur caused by hand fluctuation or the like.

2. Related Background Art

As an apparatus for preventing faulty photography due to the hand fluctuation of photographer there are many proposals of such structure as to detect fluctuation caused by the hand fluctuation, displace a correction lens in accordance with a detection value of the fluctuation, and correct a change of the optical axis of an image.

Examples of the correction method by the correction lens include a method for eccentrically moving the optical axis of a part of a taking lens in parallel (or shifting it), a method for inclining the optical axis thereof (or tilting it), a combination method of the foregoing, a method for locating a variable angle prism (VAP) in a front part of a photographic optical system, and so on.

Specially explained among them is the method for eccentrically moving a part of the taking lens. A base member of a fluctuation correction unit holds an interconnecting member free to move in a direction perpendicular to the photographic optical axis (for example, in the pitch direction). The interconnecting member holds a correction lens frame, to which the correction lens is fixed, free to move in a direction perpendicular to the foregoing direction (for example, in the yaw direction). By this arrangement, the correction lens frame is held on the base member so that the correction lens frame can freely move both in the pitch direction and in the yaw direction, perpendicular to the optical axis, relative to the base member.

An actuator for driving the correction lens is arranged in such a manner that voice coils each corresponding to the pitch direction and the yaw direction perpendicular to the photographic optical axis as discussed above are fixed to the correction lens frame and a pair of a yoke and a magnet are fixed to the base member in correspondence to each of these voice coils.

For detecting an eccentric position of the correction lens in each of the pitch direction and the yaw direction, the correction lens frame holds light projecting elements (or light receiving elements) and the base member holds light receiving elements (or light projecting elements) correspondingly thereto, whereby the position of the correction lens is detected in accordance with quantities of light received by the light receiving elements for the light from the light projecting elements. Accurate drive control of the correction lens is realized based on the position information.

As for the power supply for the fluctuation correction apparatus, some cameras use the same power supply in the camera body. Other cameras have a dedicated power supply for correction of fluctuation in order to perform the correction of fluctuation at the same time as autofocusing and aperture drive being functions of the camera body in view of the problem of power or the problem concerning the camera system.

An example of actuation of the actual fluctuation correction apparatus is to turn on a fluctuation correction start switch by an external operation to supply the power to the fluctuation correction control circuit, fluctuation sensor, and correction optical system driving means and to start the fluctuation correction operation. Another example is to start the fluctuation correction by an external switch and a release signal of camera, that is, to start it when the shutter release button of camera is half depressed in the on state of the external switch. For stopping the fluctuation correction, the external switch is turned off, or, even in the case of the external switch being in the on state, the shutter release button of camera is fully depressed to complete exposure or the half-press state of the shutter release button is released and then a lapse of a predetermined time is awaited, thus stopping the fluctuation correction. On this occasion, the correction optical system is arranged to drive the optical axis up to the position where it is coincident with the optical axis of the other taking lens, and the power supply is stopped after the correction optical system is fixed by a mechanical lock means.

Describing the detection of fluctuation in further detail, a sensor such as an angular acceleration meter or an angular velocity meter detects the fluctuation of the camera body and the lens barrel due to the hand fluctuation and an angular displacement is electrically or mechanically calculated based on a signal from the sensor.

Among such sensors, a vibratory gyro for detecting the angular velocity is recently drawing attention because of the advantages of its simple structure, compact size, and low price.

Briefly explaining the principle of operation of the vibratory gyro, a tuning bar in a shape of a circular cylinder or a prism several mm thick and several cm long approximately is vibrated at several kHz by an electrostrictive element. When rotation is applied there, force appears in the direction perpendicular to the direction of the vibration. This force is the Coriolis force, which is proportional to the angular velocity. Another electrostrictive element different from that for drive detects strain occurring because of the Coriolis force in the direction different from the direction of vibration. An output from the electrostrictive element is taken out as an ac voltage, is synchronously detected using the voltage applied to the driving electrostrictive element as a reference signal, and is let to pass through a low-pass filter. This obtains an output of a dc voltage proportional to the angular velocity of rotation.

Presently, the tuning bar, driving circuit, and detecting circuit are packed in a package of approximately 2×1×1 cm, which is commercially available. Thus, the reduction in the size and price of the vibratory gyro greatly contribute to today's wide-spread use of the fluctuation correction apparatus at the consumer-oriented product level.

When the fluctuation correction apparatus is used in a still camera or in a taking lens for a still camera, a capability of correcting the fluctuation during exposure is important. Describing in more detail, the fluctuation correction apparatus needs to operate continuously between opening and closing of the shutter, and thus, in the case of the single-lens reflex camera, the fluctuation correction apparatus usually continues operating during a period from the point of determining the composition as viewing a finder image via mirror-up and opening of shutter to closing thereof.

However, the conventional example using the vibratory gyro as a fluctuation sensor had the following problem. In the conventional example, the detection of fluctuation is carried out by vibrating the tuning bar and amplifying the small strain caused by the angular velocity of rotation, as described above. The vibration or sound during the mirror-up operation or during the shutter operation propagates in structural members or in air to generate an error signal in the vibratory gyro, which results in driving the correction optical system in accordance with a signal indicating fluctuation that is not actually occurring and thus the resulting photograph has image blur.

The present invention has been accomplished in view of the above circumstances, and an object of the present invention is to provide an optical apparatus that can prevent the operation of camera from negatively affecting the fluctuation detecting means.

SUMMARY OF THE INVENTION

According to one aspect of the present invention, an optical apparatus includes a fluctuation detection device which detects fluctuation of the apparatus; a frame body which holds the fluctuation detection device; and an optical member, wherein the frame body and the optical member are operated in order to substantially shield between a movable member and the fluctuation detection device so as to prevent a fluctuation of air caused by an operation of the movable member from traveling to the fluctuation detection device through the frame body. By this construction, the vibration of air caused by the operation of the movable member can be prevented from being transmitted to the fluctuation detection device through the frame body, thereby preventing the fluctuation of air from affecting the detection operation of the fluctuation detection device.

BRIEF DESCRIPTION OF THE DRAWINGS

FIG. 3 is a sectional view of the zoom lens barrel shown in FIG. 1, taken along plane III—III in the same drawing.

DETAILED DESCRIPTION OF THE PREFERRED EMBODIMENT

Figure 1:
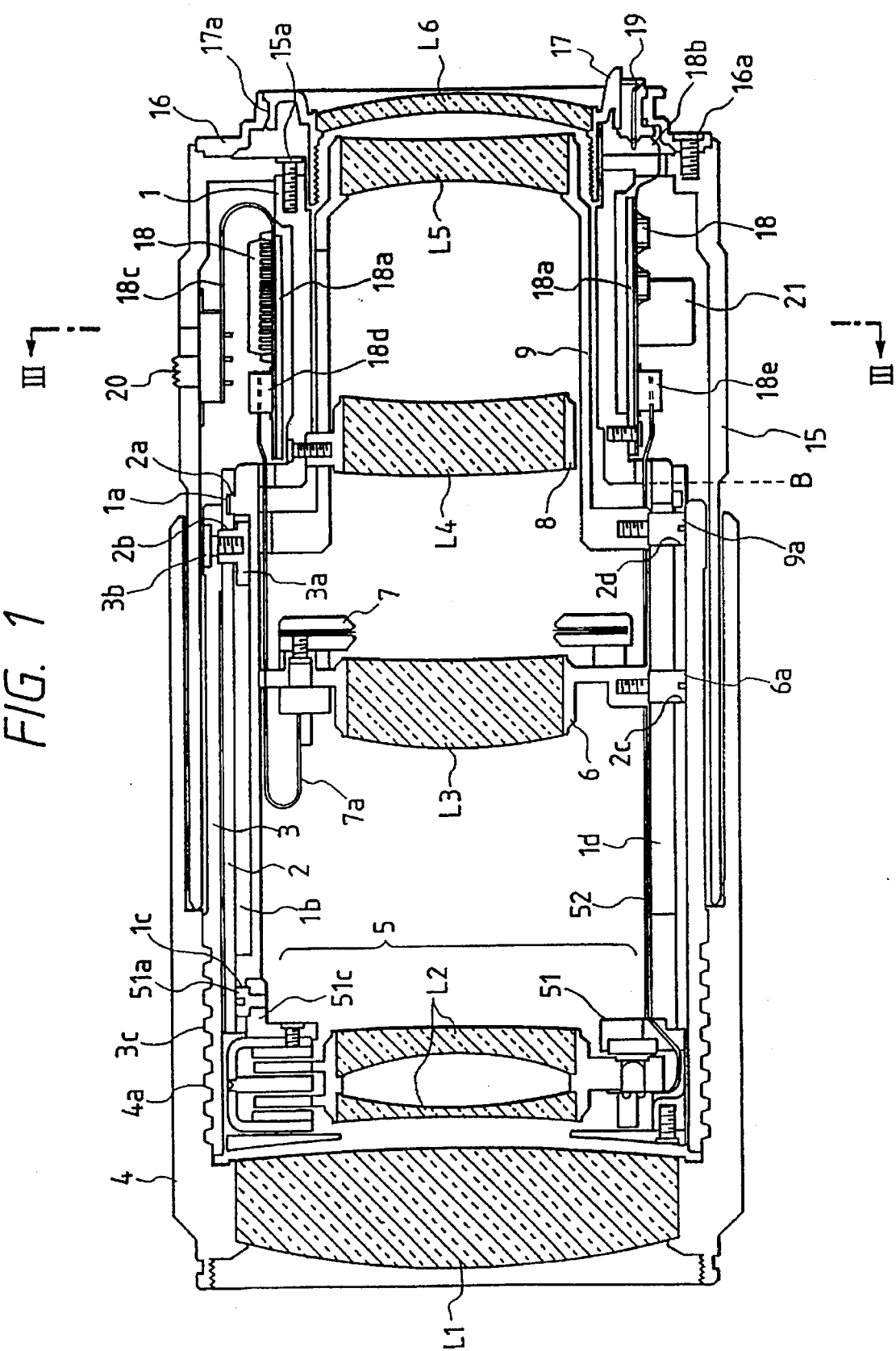
FIG. 1 is a sectional view of a zoom lens barrel of an embodiment of the present invention.

FIG. 1 is a sectional view of the zoom lens barrel as an embodiment of the present invention.

In FIG. 1, reference numeral 1 denotes a fixed barrel, which has a large-diameter portion before B in the drawing and a small-diameter portion after B in the drawing. Numeral 2 designates a cam barrel located outside the fixed barrel 1 and held as rotatable about the optical axis. The cam barrel 2 is held as rotatable at a fixed position by such bayonet coupling that projecting portions 1a provided on the fixed barrel 1 engage with circumferential grooves 2a formed in a rear part of an internal circumferential surface of the cam barrel.

Numeral 3 represents a translating barrel, in an internal circumferential portion at the rear end of which keys 3a are fixed by stepped screws 3b at three positions equally spaced. Since each key 3a simultaneously engages with a translation groove 1b provided in the fixed barrel 1 and with a first-group cam groove 2b formed in the cam barrel 2, the translating barrel 3 moves in the direction along the optical axis when the cam barrel 2 is rotated.

FIG. 1 shows a wide angle state and the translating barrel 3 is projected forward as the lens changes toward the telephoto state.

A male helicoid 3c is formed in a front outer circumferential portion of the translating barrel 3 and engages with a female helicoid 4a formed in an internal circumferential portion of a first-group barrel 4 to which a first-group lens L1 is fixed. Namely, when the first-group barrel 4 is rotated, the first-group lens L1 moves together with the first-group barrel 4 in the optical-axis direction by the helicoid mechanism.

In the present embodiment, zooming is effected by moving the first-group barrel 4 in the axial direction and thereby largely moving the first-group lens L1 integrally with the translating barrel 3, while focus adjustment is effected by rotating the first-group barrel and thereby moving the first-group lens L1 a little in the axial direction.

Numeral 5 denotes a correction unit detailed later, which is fixed by engaging rollers 51a attached to leg portions 51c projecting backward from a unit body 51 to mounting holes 1c formed in the fixed barrel.

L2 represents a second-group lens, which is not moved in the axial direction during zooming, bug which is held as movable only in directions perpendicular to the optical axis relative to the fluctuation correction unit 5 in order to correct the fluctuation.

Numeral 6 designates a third-group barrel, which secures a third-group lens L3 and firmly holds a conventional electro-magnetic aperture unit 7 by screw. The third-group barrel 6 has three rollers 6a in the circumferential direction, and the rollers 6a simultaneously engage with associated translation grooves 1d formed in the fixed barrel and with associated third-group cam grooves 2c formed in the cam barrel 2.

Numeral 8 indicates a fourth-group barrel, which secures a fourth-group lens L4 not moving during zooming and which is fixed by screw to the small-diameter portion of the fixed barrel.

Numeral 9 indicates a fifth-group barrel, which holds a fifth-group lens L5 and which has three rollers 9a on the outer circumference of a front flange portion thereof. The rollers 9a simultaneously engage with the associated translation grooves 1d, common to the third group, provided in the fixed barrel and with associated fifth-group cam grooves 2d formed in the cam barrel 2. Therefore, when the cam barrel 2 is rotated, the first-group lens L1, the third-group lens L3, and the fifth-group lens L5 move at the same time, thus performing the zooming operation.

Numeral 15 represents an exterior ring, which is fixed at the rear end to the fixed barrel 1 by screw 15a. Further, a mount 16 for mounting the lens onto the camera body is fixed to the exterior ring 15 by screw 16a.

Numeral 17 designates a back lid, which fits the inner circumference of the mount 16 and which is fixed by elasticity of claw 17a. The back lid 17 secures a sixth-group lens L6 being a fixed lens by calking.

In the present embodiment, the rear side (rear face side) of the lens barrel is perfectly shielded by the sixth-group lens L6, back lid 17, contact component 19, and mount 16. This prevents the noise, generated by the mirror-up or shutter operation when the lens barrel is mounted on the camera body and photographing is carried out, from propagating through both mounts of the camera and lens and in the air up to sensors 21. Therefore, it can prevent the sensors 21 from outputting error signals due to noise.

Numeral 18 indicates a package component comprised of a flexible print board for controlling the drive of the aforementioned aperture unit 7 and fluctuation correction unit 5, which is bonded to a polygon substrate holding table 18a by double-sided tape, and it is fixed to the outer periphery of the small-diameter portion of the fixed barrel 1 by screw.

A connection portion 18b extends backward from the package component 18 to be electrically connected to a contact component 19 for communication with the camera body. The power is supplied through the contact component 19 and the connection portion 18b for the drive of the aperture unit 7 and fluctuation correction unit 5 and also the power for the control circuit.

Symbol 7a represents a flexible print board for electrically connecting the aperture unit 7 with the package component 18. The flexible print board 7a is bent in the U-shape in the front portion thereof, whereby stable electrical connection is assured when the aperture unit 7 moves in the axial direction by zooming. The rear end of the flexible print board 7a is connected to a connector 18d in the package component 18.

Numeral 52 indicates a flexible print board for electrically connecting the fluctuation correction unit with the package component, the front end of which is connected to the driving means of the lens L2 for correction of fluctuation and to a position detecting means of the lens L2 and the rear end of which is connected to a connector 18e in the package component 18.

Numeral 20 designates a switch for switching on/off of the fluctuation correction, which is attached to the exterior ring 15 so as to be manipulated from the outside. The switch 20 communicates with the control circuit by a connection portion 18c extending from the package component 18.

Numeral 21 denotes vibratory sensors for detecting camera fluctuation including hand fluctuation and the like, which are the vibratory gyros in the present embodiment to detect the angular velocity. The vibratory sensors 21 are shown in FIG. 3, which is a sectional view of the lens barrel shown in FIG. 1, taken along plane III—III in the same drawing. As shown in FIG. 3, a sensor is fixed to each of the top face and the side face of the package component 18 so as to detect the rotational fluctuation in the vertical direction of camera (or in the pitch direction) and the rotational fluctuation in the horizontal direction (or in the yaw direction) when the lens barrel is mounted on the camera body. Each sensor is electrically wired to the image blur prevention control circuit of the package component 18. An output from each sensor is converted into an angular displacement by the image blur prevention control circuit and an eccentricity amount of the correction lens is calculated with the focal length information, object distance information, etc. in addition thereto. Then the correction lens is drive-controlled based thereon.

Figure 2:
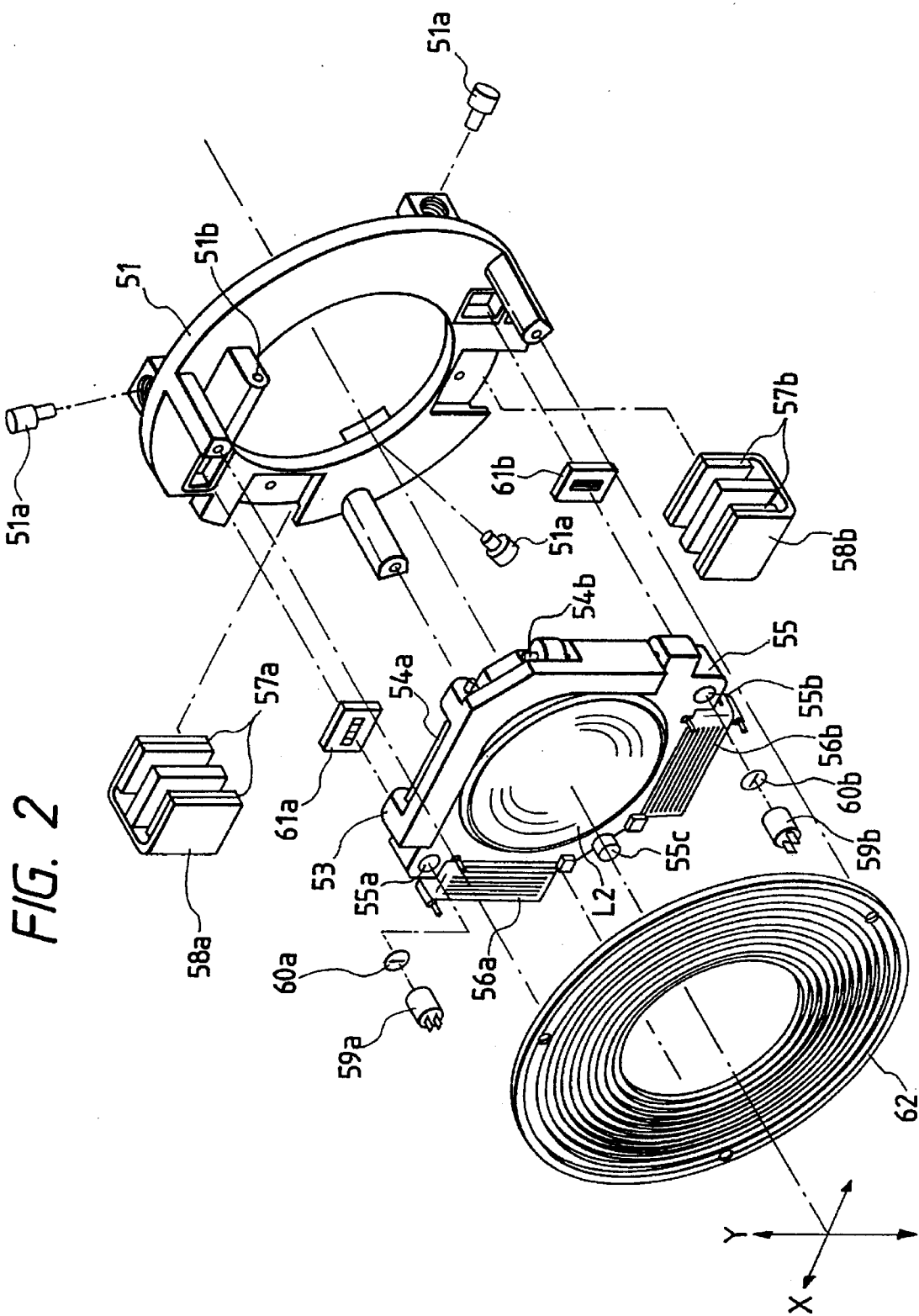
FIG. 2 is an exploded perspective view of a fluctuation correction unit incorporated in the zoom lens barrel shown in FIG. 1.

FIG. 2 is an exploded perspective view of the fluctuation correction unit 5 incorporated in the lens barrel shown in FIG. 1. The construction of the fluctuation correction unit 5 is next explained referring to FIG. 2. In FIG. 2, reference numeral 51 designates the unit body of the fluctuation correction unit 5, on the outer circumference of which the rollers 51a are fixed at three positions equally spaced. The rollers 51a engage with the associated fitting holes 1c of the fixed barrel 1, thereby holding the entire fluctuation correction unit 5.

Numeral 53 denotes an interconnecting arm, which is supported as movable in the horizontal direction (hereinafter referred to as the X direction) relative to a pin 54a. A pin 54b is fixed to the interconnecting arm 53 as being directed in the vertical direction (hereinafter referred to as the Y direction), and an eccentric frame 55 is held as movable in the Y direction relative to the pin 54b. When the above pin 54a is fixed in a hole 51b of the unit body 51, the eccentric frame 55 comes to be held as movable both in the X direction and in the Y direction relative to the unit body 51.

Further, for preventing the eccentric frame 55 from moving in the optical-axis direction (in the Z direction), projections 55c are formed on the front face and on the rear face of the eccentric frame 55, so that the projections 55c prevent the movement in the optical-axis direction as being in contact with the front face of the unit body and the rear face of a light-shield plate 62 described below.

Voice coils 56a, 56b are bonded to the eccentric frame 55 and are provided for drive in the X direction and in the Y direction, respectively. Fixed to the unit body 51 by screws are yokes 58a, 58b to which magnets 57a, 57b, respectively, are bonded at positions corresponding to the voice coils 56a, 56b.

As an eccentric position detecting means of the eccentric frame 55, a pair of IREDs 59a, 59b as light projecting elements are set together with slits 60a, 60b in corresponding holes 55a, 55b of the eccentric frame 55 and are fixed therein, and a pair of PSDs 61a, 61b as light receiving elements are fixed to the unit body 51.

Numeral 62 denotes a light-shield plate, which is fixed to the front end of the unit body 51 by screws and on the front surface of which light-shield lines are formed.

During the fluctuation correction, the light-shield plate 62 prevents stray light from entering the PSDs 61a, 61b upon detection of an eccentric amount of the correction lens L2 and functions to limit the light beam incident from the front surface of the lens.

In the present embodiment, the hermetic shield structure is constructed of the mount 16, the contact component 19, the back lid 17, and the sixth-group lens L6 of the fixed group, being a part of the photographic optical system, thereby preventing intrusion of noise from the camera body and preventing output of an error signal from the sensors.

As explained above, the structure of the embodiment of the present invention stops the fluctuation of air caused in the camera body from propagating to the fluctuation detecting means, which can prevent the problem of the error detection or the like while preventing the fluctuation of air caused in the camera body from affecting the fluctuation detecting means.

The present invention is by no means limited to this construction, but a protective glass plate may replace the lens L6 having power.

The structure of the present invention can also be applied to the single-lens reflex camera, the lens shutter camera, the video camera, optical equipment other than the cameras, other apparatus, and so on.

In the present invention, the components stated in the claims or owned by the embodiment or some of them may be set in a single device or in separate devices. An example may be such that the fluctuation detection apparatus is set in the camera body while the fluctuation correction apparatus in the lens barrel mounted to the camera.

In the present invention, the fluctuation preventing means is not limited to those for directly preventing the fluctuation, but may be one for preventing the fluctuation from occurring in an indirect manner by generating an alarm signal such as light or sound to notify a user of occurrence of fluctuation or possibility of occurrence thereof.

In the present invention, the fluctuation detecting means may be selected from not only the vibratory gyro, but also other sensors sensitive to sound or vibration, such as an angular acceleration meter, an acceleration meter, an angular velocity meter, a velocity meter, an angular displacement meter, and a displacement meter.

In the present invention, the fluctuation preventing means may be selected from not only the shift optical system for moving the optical member in the plane perpendicular to the optical axis, shown as an embodiment, but also any other means that can prevent the fluctuation, including another beam changing means such as a variable angle prism, one for moving the photographic plane in the plane perpendicular to the optical axis, and one for correcting the fluctuation by image processing.

In addition to the foregoing, the following points should be noted.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the Drawings are all well-known in the camera arts and their specific construction and operation are not critical to the operation or best mode for carrying out the invention.

Also, the present invention may involve all combinations of the above embodiment or the technical elements thereof with necessity.

What is claimed is:

1. An optical apparatus comprising:

a fluctuation detection device which detects a fluctuation of the apparatus;

a frame body which holds said fluctuation detection device; and an optical member, wherein said frame body and said optical member are operated in order to substantially shield between a movable member and said fluctuation detection device so as to prevent a fluctuation of air caused by an operation of said movable member from traveling to said fluctuation detection device through said frame body.

2. The apparatus according to claim 1, wherein the movable member is an operation portion of a camera.

3. The apparatus according to claim 2, wherein the movable member is a shutter member of the camera.

4. The apparatus according to claim 1, wherein said optical member and said frame body comprise means for acting in order to form a shield structure to shield a space containing the fluctuation detection device from a space containing the movable member.

5. The apparatus according to claim 1, wherein said optical member and said frame body are integrally constructed.

6. The apparatus according to claim 5, wherein said frame body is an outer frame of the optical apparatus.

7. The apparatus according to claim 2, wherein the optical apparatus is an interchangeable lens device attached to the camera.

8. The apparatus according to claim 7, wherein the movable member is set in the camera and said optical member is a lens member closest to the camera.

9. The apparatus according to claim 1, wherein said fluctuation detection device comprises a vibratory gyro.

10. The apparatus according to claim 1, further comprising:

an image blur prevention device for preventing an image blur in accordance with an output from said fluctuation detection device.

* * * * *